June 23, 1953

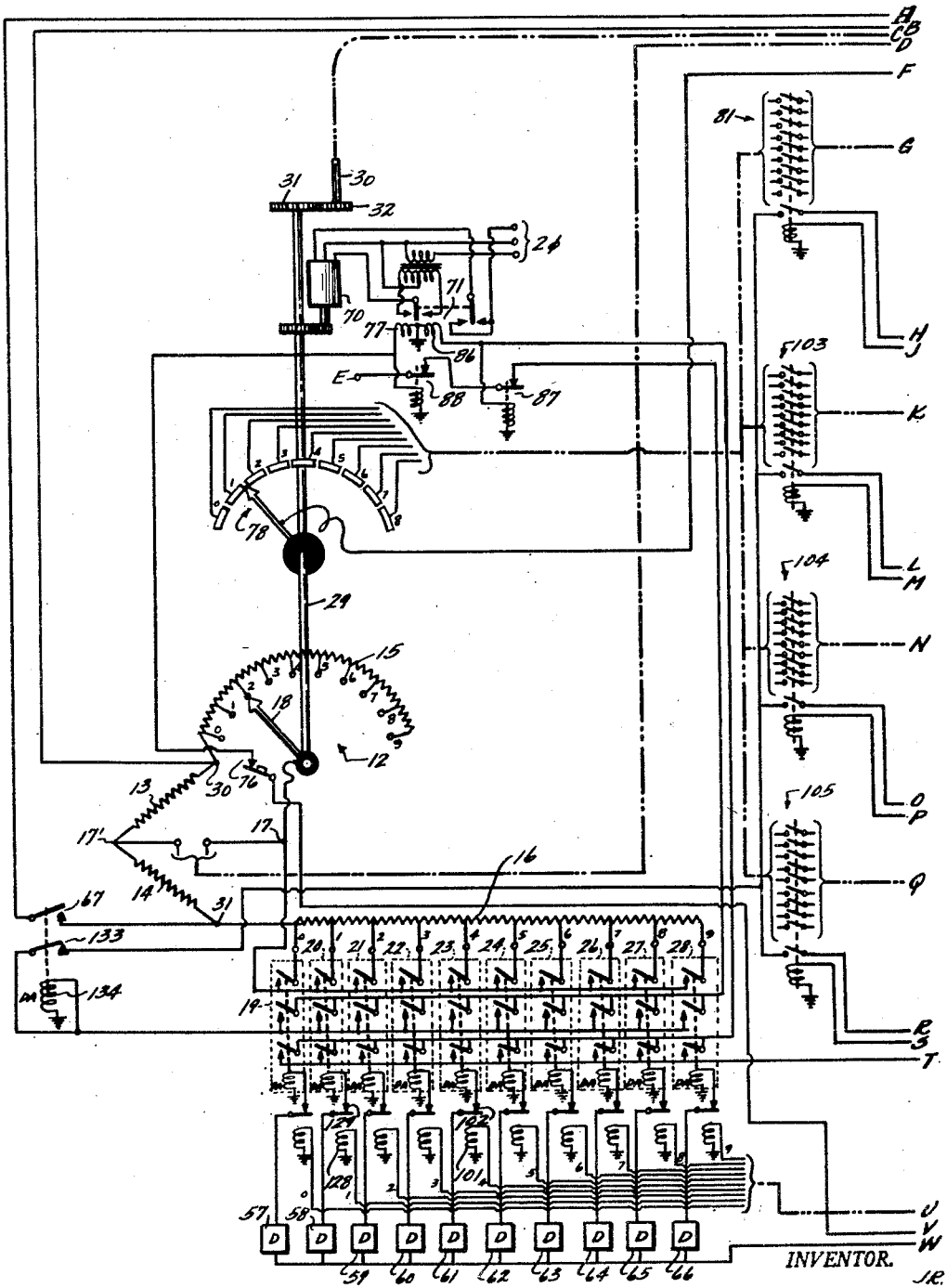

L. B. HALLMAN, JR 2,643,355

COMPUTER FOR CONVERTING ELECTRICAL
CODE INTO SHAFT ROTATION

Filed June 15, 1951

INVENTOR.
LUDLOW B. HALLMAN, JR.
BY Wade Koontz
ATTORNEY
James S. Shannon
AGENT

Patented June 23, 1953

2,643,355

UNITED STATES PATENT OFFICE 2,643,355

COMPUTER FOR CONVERTING ELECTRICAL CODE INTO SHAFT ROTATION

Ludlow B. Hallman, Jr., Dayton, Ohio

Application June 15, 1951, Serial No. 231,885

6 Claims. (Cl. 318—29)

(Granted under Title 35, U. S. Code (1952), sec. 266)

The invention described herein may be manufactured and used by or for the United States Government for governmental purposes without payment to me of any royalty thereon.

This invention relates to an electrical computing device for converting an electrical pulse-type code into revolutions of a shaft. The device finds particular usefulness in automatic landing systems for aircraft in cases where it is desired to transmit runway elevation data to the airplane in the form of a shaft rotation, but it may be used in any application requiring a remote control of the total number of revolutions which a shaft has undergone as measured from the starting or zero revolution position of the shaft.

In brief the computer comprises an adjustable Wheatstone bridge, a shaft, and a plurality of parallel mechanical couplings between the shaft and the adjusting mechanism of the bridge. There are as many of these couplings as there are digits in the maximum desired number of revolutions of the shaft. Each of the couplings contains a gear box having a ratio related to the ratios of the other gear boxes in multiples of ten, in the same manner that the places of a decimal number are related. The desired number of revolutions of the shaft is transmitted to the computer in the form of successive electrical codes representing the digits of the decimal number corresponding to the number of revolutions. In response to each code transmission the computer couples the shaft to the bridge adjusting mechanism through the appropriate gear box and also unbalances the bridge by an amount proportional to the value of the particular digit. A motor is then energized and rotates the shaft until the bridge is balanced. This process is repeated for each digit of the number until the desired total number of rotations of the shaft has been achieved. The computer contains means for increasing or decreasing the total number of revolutions of the shaft, as measured from its zero or reference position, at any time by adding to or subtracting from the then existing total number of revolutions by the required amount.

A more detailed explanation of the invention will be given in connection with a specific embodiment thereof shown in the accompanying drawings, in which Figs. 1a and 1b show in schematic form a computer in accordance with the invention;

Figure 1B:
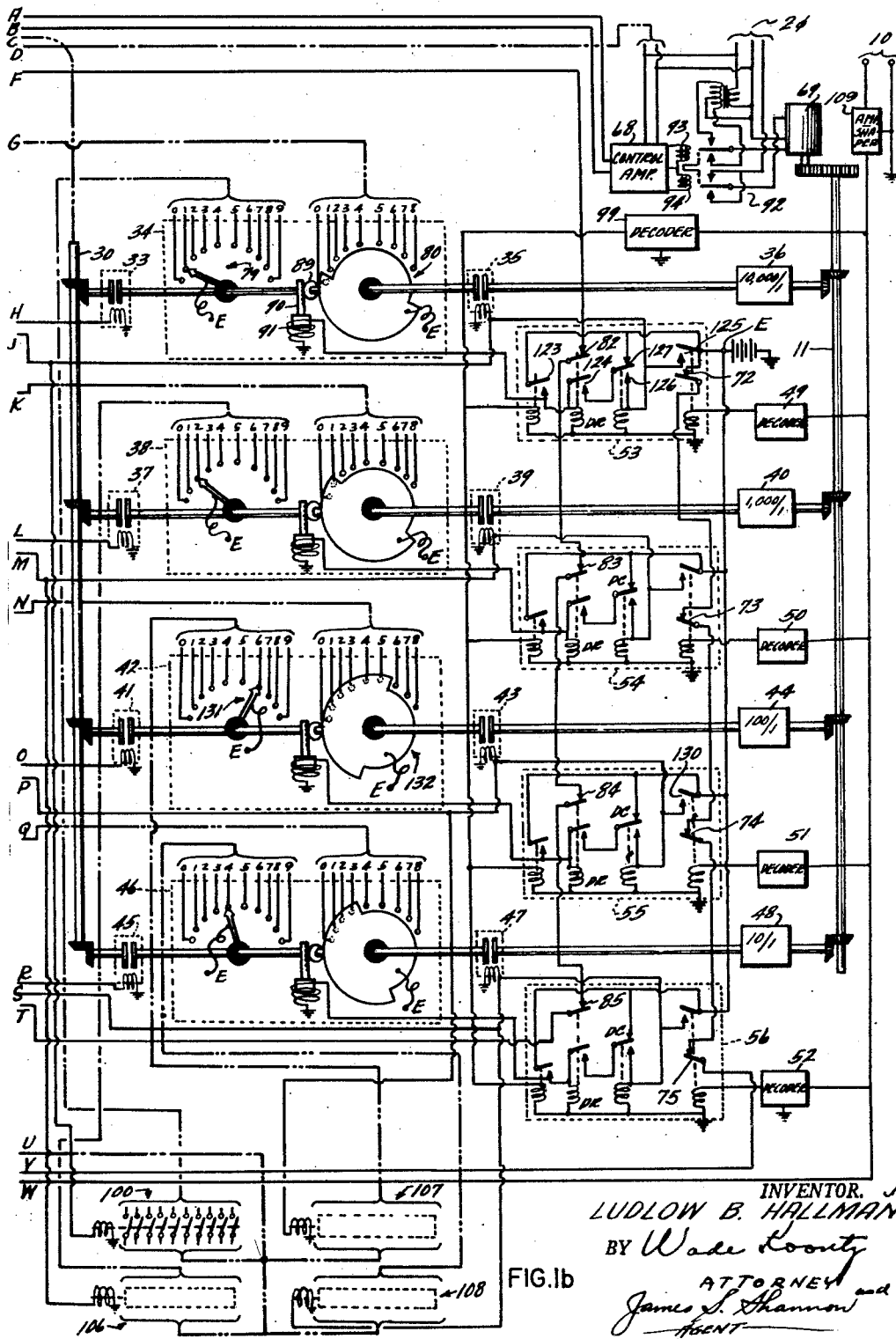

Referring to Figs. 1a and 1b the computer has input terminals 10 and an output shaft 11. Upon application of a coded electrical signal to terminals 10 the computer operates to produce the number of revolutions of shaft 11 specified by the signal. The revolutions of the shaft are produced in a series of steps, there being one step for each place in the decimal number expressing the desired number of revolutions. For example, if the desired number of revolutions is 1264, the computer produces 1000 revolutions of the shaft 11 in the first step, 200 revolutions in the second step, 60 revolutions in the third step and 4 revolutions in the fourth step. The maximum number of steps is therefore determined by the maximum number of revolutions that the computer will be required to produce. The computer shown operates in four steps and is therefore capable of producing revolutions of shaft 11 and a minimum of 1 to a maximum of 999.

The number of revolutions produced in each step is determined by the rotations of shaft 11 necessary to balance Wheatstone bridge 12 which is mechanically coupled to the shaft and which has been unbalanced, in response to the coded signal, by an amount proportional to the number of revolutions of the shaft required in the particular step. The bridge 12 is composed of fixed arms 13 and 14 and adjustable arms 15 and 16. Arms 15 and 16 are identical, each being divided into nine equal sections by taps numbered 0 through 9. The arm 15 is connected to point 17 of the bridge by rotating contact 18 which may engage any of the taps 0–9, while the arm 16 is connected to point 17 by the upper contacts of whichever of relays 19 through 28 is actuated at the time. The bridge is energized by alternating voltage applied between points 17 and 17', and the output is taken from points 30 and 31. The use of alternating voltage allows the bridge to indicate the direction of unbalance by the phase of the output voltage.

The rotating contact 18 is mounted on shaft 29 which is mechanically coupled to shaft 30 by gears 31 and 32. Shaft 30 may in turn be coupled to shaft 11 through any one of four parallel paths. One of these paths comprises magnetic clutch 33, memory device 34, magnetic clutch 35 and 10,000/1 gear box 36. The remaining three paths comprise elements 37—38—39—40, 41—42—43—44 and 45—46—47—48. These elements are identical to the corresponding elements in the first described path with the exception of the gear boxes which have gear ratios that are related to each other in multiples of 10, as indicated on the drawing. The total gearing between shaft 11 is such that when the 10,000/1 gear box is engaged, 9000 revolutions of shaft 11 are required to move contact 18 of the bridge from tap 0 to tap 9; whereas, for the 1000/1 gear box 900 revolutions are required, for the 100/1 gear box 90 revolutions are required, and for the 10/1 gear box 9 revolutions are required for the movement of contact 18 from tap 0 to tap 9.

Associated with each of the gear boxes 36, 40, 44 and 48 are decoders 49, 50, 51 and 52, respectively, which, in the presence of an appropriate signal, operate through relay groups 53, 54, 55 and 56, respectively, to engage magnetic clutches 35, 39, 43 and 47, respectively, for coupling shaft 11 to shaft 29 through the appropriate gear box. The signal also contains information as to the number of revolutions required of shaft 11 during the time each of the gear boxes is engaged. This part of the signal operates through one of the digit decoders 57—66 to close one of the relays 19—28. This action connects the appropriate tap of resistor 16 to point 17 of the bridge, and energizes relay coil 134 which engages one of the magnetic clutches 33—37—41—45 through contacts 133, depending upon which gear box is engaged at the time, and connects control amplifier 68 to the bridge through contacts 67. The output signal of the bridge then operates through control amplifier 68 to cause motor 69 to rotate shaft 11 in the proper direction to balance the bridge. This process is repeated for each of the gear boxes.

After shaft 11 has rotated through the required number of revolutions for a particular gear box and after the signal has ceased, the bridge is reset to its zero position. This is accomplished by a torque producing device 70 coupled to shaft 29. In the embodiment shown 70 is a two phase motor. When polarized relay 71 is in the center position the motor 70 is deenergized. Application of voltage from terminal E, which in all occurrences in the drawing represents a source of power either A. C. or D. C. for operating the various relays, through reset interlock contacts 72, 73, 74 and 75 and thence through limit switch 76 to coil 77 of relay 71 closes the left-hand contacts of the relay 71. This energizes motor 70 which drives the bridge contact 18 counterclockwise toward its zero position where it is stopped by limit switch 76.

As has already been pointed out the computer shown produces the desired number of revolutions of shaft 11 in four steps. In the first step the required number of thousands of revolutions are produced with gear box 36 engaged; in the second step the required number of hundreds of revolutions are produced with gear box 40 engaged; in the third step the required number of tens of revolutions are produced with gear box 44 engaged, and in the fourth step the required number of units of revolutions are produced with gear box 48 engaged. These revolutions of shaft 11 add to produce the required total number of revolutions as measured from the start or zero revolution condition of the shaft and as specified by the received signal. The signal applied to the computer always calls for a desired total number of revolutions of the shaft. Consequently signals subsequent to the first may call for a greater or lesser number of total revolutions than did the first signal. The computer responds to these signals by adding to or subtracting from the existing total number of revolutions of the shaft by the amount required to produce the new total. Reduction of the total number of revolutions is accomplished by rotating the shaft backward.

Corrections in the total number of revolutions, as described above, require a means for resetting the bridge to the positions of balance which existed for the preceding signal. Corrections are then made by driving the bridge through the appropriate gear box from the preceding position of balance to the new position of balance called for by the new signal. Such resetting of the bridge is accomplished by a memory device associated with each of the gear boxes, the rotating switch 78 associated with the adjustable arm of the potentiometer, and motor 70. Memory devices 34, 38, 42 and 46 are all identical. When the bridge is driven to a position of balance through one of the four gear boxes the two rotary switches of the associated memory device are also driven to a position corresponding to the balance point of the bridge. Upon receipt of the next signal engaging the gear box associated with the particular memory device that device operates to reset the bridge to the preceding position of balance if the signal has changed. If the signal is the same as the preceding signal no resetting of the bridge takes place.

How the above is accomplished may be seen by referring to memory device 34. This device is associated with the 10,000/1 gear box and comprises rotary switches 79 and 80. Assume that the preceding signal for gear box 36 had caused the bridge to balance at tap 1. This resulted in switch 79 being moved to contact 1 and in switch 80 being moved to such a position as to make contact with all contacts except 1 and beyond, as shown in Fig. 1b. With switch 80 in the position shown, segment 0 of switch 78 is energized through switch 81. Since the bridge arm 18 and switch 78 have been previously reset to their zero positions, voltage is applied through segment 0 and the arm of switch 78, through interlock contacts 82, 83, 84 and 85 of relay groups 53, 54, 55 and 56, and through the lower contacts of whichever of digit relays 19—28 was actuated by the new signal, to coil 86 of relay 71. This actuates relay 71 to the right causing motor 70 to drive the bridge contact 18 and switch 78 in a clockwise direction. This continues until the contact of switch 78 reaches the first deenergized segment, which in this case is 1. At this point relay 71 is deenergized and motor 70 stops. The bridge has now been reset to the position of balance that existed the last time operation through the 10,000/1 gear box took place.

Energization of relay 71 through coil 86 causes interlock contacts 87 to open. Therefore when coil 86 is deenergized, after the bridge has been reset, contacts 87 close and voltage is applied through interlock contacts 88, interlock contacts 87, and the middle contacts of whichever of digit relays 19—28 has been closed by the signal, to coil 134. Energization of coil 134 applies voltage to clutch 33 through contacts 133 and switch 81 and applies the output voltage of the bridge to phase sensitive control amplifier 68 through contacts 67, which causes motor 69 to rotate shaft 11 in the proper direction to balance the bridge which is now coupled to shaft 11 through magnetic clutch 33, memory device 34, magnetic clutch 35 and gear box 36. Since the memory device is a part of this coupling train it is reset in the process to the new position of balance of the bridge.

The function of switch 79 is to prevent the needless resetting of the bridge to its previous balance position in the event that the new signal is the same as the preceding signal. Referring again to memory device 34 and assuming that the bridge had been previously balanced at 1, as shown by the fact the switch 79 is on contact 1, and that the new signal is the same as the preceding signal and therefore is passed by digit decoder 58 for the purpose of actuating digit relay 20 associated with tap 1 of the bridge arm 16. If relay 20 were allowed to close coil 86 of relay 71 would be energized and the bridge arm 18 needlessly moved to tap 1. This is prevented, however, by switch 79 which applies a voltage through contact 1 thereof and switch 100 to coil 128 which opens contacts 129 thereby preventing closure of relay 20. The remaining relays like relay 128—129 are associated with the remaining digit relays and the remaining contacts on switch 79 for the same purpose.

The memory device 34 also contains a reset mechanism comprising pinion 89, rack 90 and solenoid 91. This mechanism functions only in initiating operation of the computer, at which time a start signal energizes solenoid 91 and resets the memory device to zero. Remaining memory devices 38, 42 and 46 are identical in construction and operation to device 34. Switches 103, 104, 105 are associated with memory devices 38, 42 and 46 in the same manner as switch 81 is associated with device 34, and, similarly, switches 106, 107, 108 bear the same relationship to these devices as switch 100 does to memory device 34.

The motors 69 and 70 may be any suitable reversible motors with appropriate control circuits. In the embodiment illustrated these are shown as two-phase motors with a center-tapped transformer and relay used to invert one of the phases for reversing the motor. The operation of relay 71 has already been explained. Relay 92 is similar to relay 71 in operation. Energization of coil 93 operates relay 92 upward for rotation in one direction and energization of coil 94 operates the relay downward for rotation in the opposite direction. When the relay is in its neutral or center position the motor is deenergized. Both motors 69 and 70 should have provisions, either electrical or mechanical, for stopping rotation immediately upon deenergization. Since a number of means for accomplishing this result are known and since this feature does not form a part of the invention no specific braking mechanism is illustrated.

Figure 5:
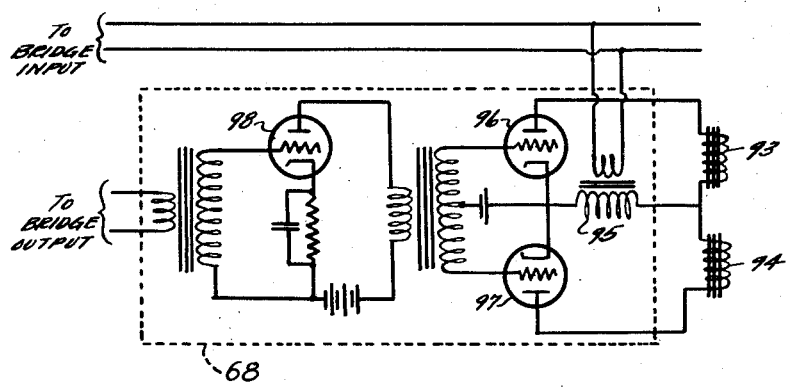
Fig. 5 shows a suitable control amplifier for use in the computer.

The output voltage of the bridge will be in phase with or 180° out of phase with the energizing voltage depending upon the direction of unbalance. The control amplifier 68 compares the phases of these two voltages and energizes the proper one of coils 92 and 93 to produce rotation of shaft 11 in the direction required to balance the bridge. A suitable amplifier for this purpose is shown in Fig. 5. The energizing voltage of the bridge is also applied through transformer 95 to the anodes of tubes 96 and 97 in the same phase, while the output voltage of the bridge, after amplification by tube 98, is applied to the grids of tubes 96 and 97 in opposite phase. Therefore, the voltages on the anode and grid will be in phase in one of tubes 96 and 97 and 180° out of phase in the other tube. By properly biasing the grids of the tubes there will be no current flow in the anode circuit of the tube in which the voltages are of opposed phase, while a flow of current sufficient to operate relay 92 will flow in the anode circuit of the tube in which the anode and grid voltages are of the same phase. In the absence of an output signal from the bridge there will be no signal on the grids of tubes 96 and 97 and consequently the anode currents will be equal and relay 92 will not be actuated. These latter currents may be made very small or even zero by applying sufficient bias to the grids of the tubes.

The decoder 99 may be termed the "start" decoder. It responds to a "start" signal to zero the memory devices 34, 38, 42 and 46 and to open interlock contacts 82, 83, 84 and 85. The decoders 49, 50, 51 and 52 may be termed the "thousands," "hundreds," "tens" and "units" decoders, respectively, and in effect, they represent the four places of a four-place decimal number. These decoders respond, respectively, to signals calling for engagement of the 10,000/1, the 1000/1, the 100/1 and the 10/1 gear boxes. Decoders 57—66 are digit decoders which respond to signals specifying the proper digit for each of the four places of the decimal number represented by the decoders 49, 50, 51 and 52.

The coded signal is applied to terminals 10 and through amplifier and shaper 109 to the inputs of the decoders in parallel. The amplifier and shaper 109 may be any suitable amplifier and clipping or limiting device to insure that the signals applied to the decoders will be of uniform amplitude and form so as to avoid any erratic operation of the computer from this source.

Figure 2:
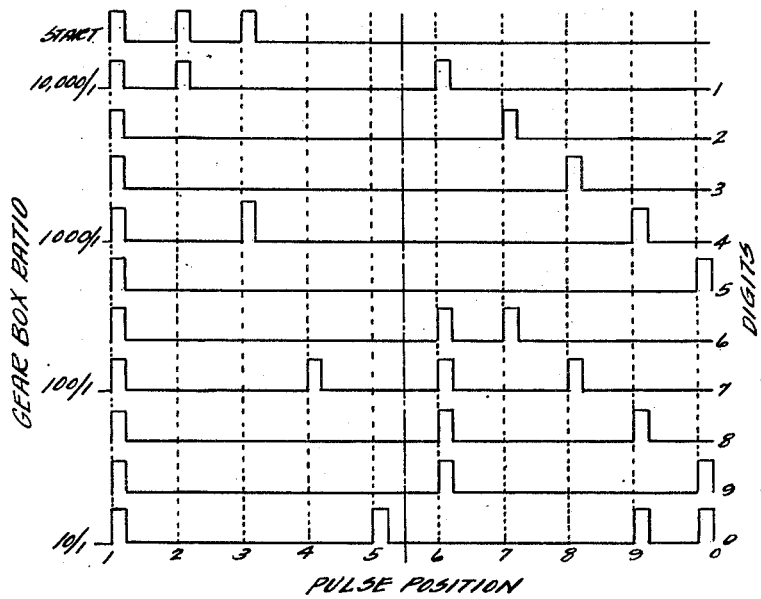
Fig. 2 shows a suitable code for use with the computer.

The ten position binary code used with the computer is shown in Fig. 2. The "start" signal is shown in the first line and consists of three pulses occupying the first three positions of the code. All signals applied to the computer other than the "start" signal are in the nature of a combined signal in which the first pulse and the second pulse determine which of the four gear boxes is to be engaged and in which the first pulse together with the third pulse or, in some cases, the third and fourth pulses, determine which of the digit relays 19—28 is to be actuated. All the required pulse combinations are indicated in Fig. 2 in which the two pulses to the left of the center line constitute the gear box signal and the first pulse to the left of the center line together with the pulse or pulses to the right of the center line constitute the digit signal. For example, if the 1000/1 gear box and digit relay 25 corresponding to the digit 6 are to be actuated the required signal would contain pulses at positions 1, 3, 6 and 7.

Figure 3:
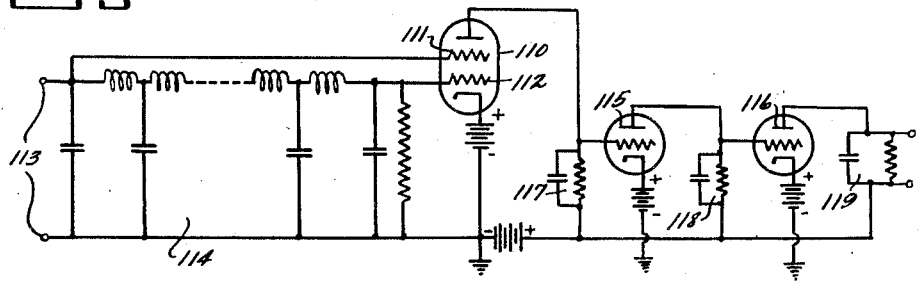
Figs. 3 and 4 show suitable forms of decoders for use in the computer.

From Fig. 2 it is apparent that decoder 99 must be a three pulse decoder, decoders 49, 50, 51 and 52 must be two pulse decoders, decoders 58, 59, 60, 61 and 62, corresponding to digits 1, 2, 3, 4 and 5, must be two pulse decoders, and decoders 63, 64, 65, 66 and 57, corresponding to digits 6, 7, 8, 9 and 0, must be three pulse decoders. A suitable two pulse decoder is shown in Fig. 3. In this circuit tube 10 is so biased that it will conduct only in the presence of positive pulses on grids 111 and 112 simultaneously. The signal is applied from input terminals 113 directly to grid 111 and through delay line 114 to grid 112. If the delay produced by line 114 is exactly equal to the interval between the two pulses of the signal the first pulse will arrive at grid 112 at the same time that the second pulse arrives at grid 111 and plate conduction will occur. If the separation of the pulses differs from the delay of the line concurrence of the pulses will not occur. Tubes 115 and 116 are direct current amplifiers and circuits 117, 118 and 119 are integrating networks to produce a steady output in the presence of a repeated two-pulse signal.

Figure 4:
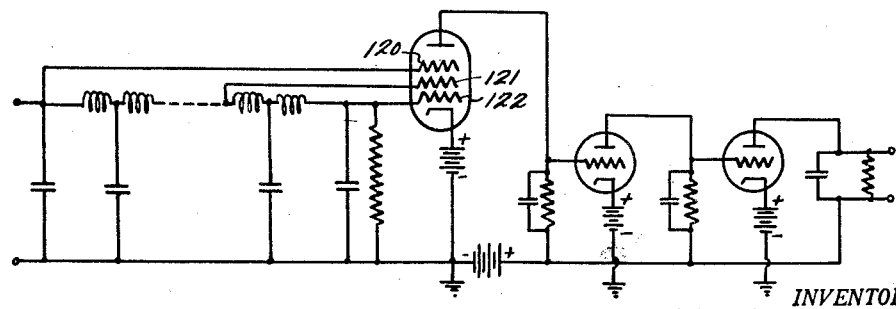

A suitable three-pulse decoder is shown in Fig. 4. This decoder operates on the same principle as that in Fig. 3. The tube contains three instead of two grids and pulses must be applied simultaneously to all three grids to cause plate conduction. To accomplish this the delay of the entire transmission line is made equal to the time interval between the first and third pulses while the delay of that part of the line between grids 120 and 121 is made equal to the interval between the first and second pulses. This results in the simultaneous appearances of the first pulse on grid 122, the second pulse on grid 121 and the first pulse on grid 120.

Figure 6:
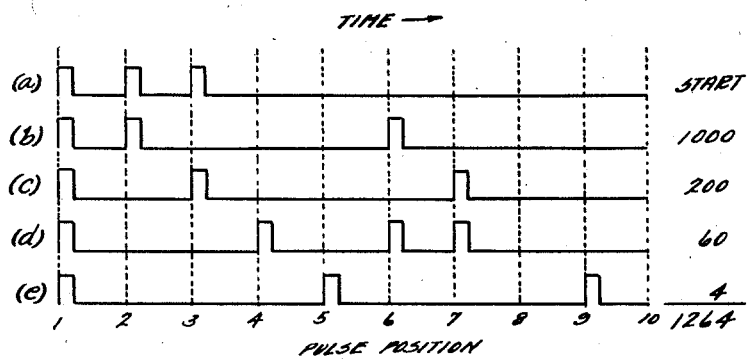
Figs. 6 and 7 shows specific examples of the several codes necessary to produce a specified number of revolutions of the computer shaft.

The preceding descriptive matter has dealt with the construction and operation of the principal components of the computer. The operation of the computer as a whole can best be demonstrated by a specific example. Assume that it is desired to produce 1264 revolutions of shaft 11 as measured from its zero position. The necessary signals, derived from Fig. 2, are shown in Fig. 6. Five distinct signals marked (a) through (e) are required. Each of these signals is transmitted to the computer repeatedly for a sufficient period of time for the function called for by the signal to be performed.

In initiating operation of the computer, if the bridge 12 is not in its zero position it will be reset to zero when power is applied to the computer by voltage applied from E through contacts 72, 73, 74, 75 and 76 to the zero reset coil 77 of relay 71. The first signal to be applied to terminals 10 of the computer is start signal (a) of Fig. 6. This signal produces a direct output current from decoder 99 which closes contacts 123 of relay group 53 and the corresponding contacts in identical relay groups 54, 55 and 56. Closure of contacts 123 closes contacts 124 and opens contacts 82. Closure of contacts 124 applies voltage from E to the coil of this relay which will hold contacts 82 open after contacts 123 have been released at the end of the start signal. In a similar manner contacts 83, 84 and 85 of relay groups 54, 55 and 56 are opened and held open. Closure of contacts 123 also applies voltage to reset solenoid 91 which resets memory device 34 to zero. In a similar manner memory devices 38, 42 and 46 are reset to zero. The function of the start signal, therefore, is to reset the memory devices to zero and to open interlock contacts 82, 83, 84 and 85. Opening of these contacts prevents energization of coil 86 of relay 71 until initial operation through each of the four gear boxes has taken place.

The next signal applied to the computer is the signal (b). The first two pulses from this signal produce an output from decoder 49 which opens contacts 72 and closes contacts 125. Closure of contacts 125 results in closure of contact 126 and opening of contact 127 thus transferring the holding circuit for contacts 82 and 124 from contact 127 to contact 126. In order to prevent opening of contacts 124 and the resulting closure of contacts 82 by this transfer this relay is of the delayed release type as indicated by the symbol DR. Closure of contacts 125 also energizes magnetic clutch 35, switch 81 and switch 100.

The first and third pulse of signal (b) produce an output from digit decoder 58 which actuates digit relay 20, the upper contacts of which connect tap 1 in resistor 16 to point 17 of the bridge. Closure of the middle contacts of relay 20 energizes relay coil 134 and applies voltage through contacts 133 and switch 81 to the magnetic clutch 33. Closure of contacts 67 applies the output signal of the bridge to control amplifier 68 which causes motor 69 to rotate shaft 11 and to drive contact 18 of the bridge in a clockwise direction through the 10,000/1 gear box and memory device 34. When contact 18 reaches tap 1 the bridge is balanced, its output becomes zero and rotation of motor 69 ceases. In moving contact 18 from its zero position to tap 1, shaft 11 will have made 1000 revolutions.

Rotation of shaft 11 also drove rotary switches 79 and 80 of the memory device 34 along with the bridge to their #1 positions. Voltage from E is applied through switch 79, conductor 1 and switch 100 to coil 128 thus opening contacts 129 and deenergizing relay 20. Opening of the middle contacts of relay 20 deenergizes coil 134 thus releasing magnetic clutch 33 and disconnecting amplifier 68 from the bridge by opening contacts 133 and 67. Energization of coil 86 of relay 71 through switches 80 and 78 however, is not possible since contacts 82, 83, 84 and 85 are open.

Cessation of signal (b) reduces the output of decoder 49 to zero closing contacts 72 and opening contacts 125. Closure of contacts 72 energizes coil 77 of relay 71 and resets the bridge to zero. Resetting of the bridge does not affect the setting of memory device 34 since clutch 33 is released. Opening of contacts 125 releases contact 126 and as a result breaks the holding circuit for contacts 82 and 124, allowing the former to close and the latter to open. In order to insure that contacts 124 open before contact 127 closes the latter contact is of the delayed closing type as indicated by the symbol DC. Opening of contacts 125 also releases magnetic clutch 35 and switch 81. This completes the first step in the initial cycle of operation of the computer. One thousand of the required 1264 revolutions were imparted to shaft 11 in this step.

The second step in the cycle is initiated by the application of signal (c) of Fig. 6 to the terminals 10 of the computer. The operation of the computer in the second step is identical with that in the first step described above and results in 200 more of the required 1264 revolutions of shaft 11. The first two pulses of signal (c) acting through decoder 50 cause engagement of the 1000/1 gear box and the first and third pulses of this signal act through digit decoder 59 to energize digit relay 21 and connect tap 2 of resistor 16 to point 17 of the bridge. Motor 69 acting through shaft 11 and the 1000/1 gear box moves contact 18 of the bridge from tap 0 to tap 2 where the bridge balances. This requires 200 revolutions of shaft 11.

The third and fourth steps of operation result from signals (d) and (e) respectively. The third step involves 100/1 gear box 44 and digit relay 25, and results in 60 more revolutions of shaft 11 bringing the total number of revolutions at this point to 1260. The fourth and final step of operation involves the 10/1 gear box 48 and digit relay 23, and results in four additional revolutions of shaft 11 making the final total 1264 as required. The operation of the computer in the third and fourth steps is identical with its operation in the first step.

At any time after the initial cycle of operation described above has been completed the computer is ready to receive new signals calling for total revolutions of shaft 11 greater or less than the then existing total number of revolutions. If the required total number is greater than the existing number of revolutions the computer rotates the shaft forward through the necessary number of revolutions to build the existing total up to the required new total. If the new signal calls for a total number of revolutions less than the then existing total the computer rotates the shaft backward the necessary number of times to reduce the existing total to the required new lower total. This type operation also can best be explained by a specific example. Assume that the next signal to be received following the initial signal calls for a total number of revolutions of shaft 11 of 1248, requiring that the shaft be rotated backward through 16 revolutions to reduce the existing total of 1264 to the new total of 1248. The complete signal in this case is shown in Fig. 7.

Figure 7:
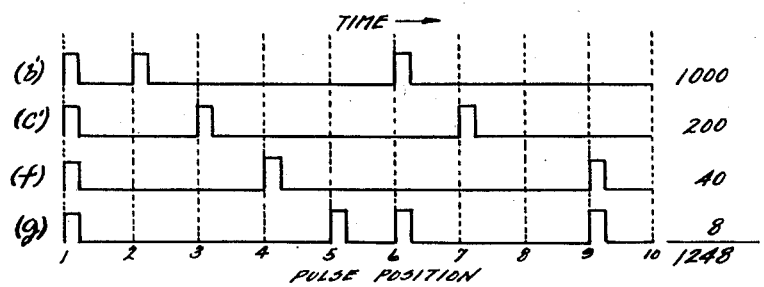

The first two parts of the new signal, marked (b') and (c') in Fig. 7, are the same as the first two parts (b) and (c) of the initial signal shown in Fig. 6, since no change in the "thousands" place or the "hundreds" place of the total is required. The response of the computer to signals (b') and (c') is as follows: The application of signal (b') to the computer produces an output from gear box decoder 49 and digit decoder 58. The output from decoder 49 closes contacts 125 which applies voltage to and closes switch 100. In the first step of the initial cycle of operation of the computer, switch 79 of memory device 34 was positioned on contact 1 and it is still in this position. Closure of switch 100 therefore causes a voltage to be applied from E through contact 1 of switch 79 and through switch 100 to coil 128 thus opening contacts 129 in series with the coil of digit relay 20 and preventing actuation of this relay by the output voltage of decoder 58. In order to insure opening of contacts 129 before actuation of relay 20 can take place this relay is of the delayed actuation type as indicated by the symbol DA. Since relay 20 is thus prevented from closing relays coils 134 and 86 can not be energized and no rotation of shaft 11 by motor 69 or resetting of the bridge by motor 70 can take place. The computer remains in this inactive state until signal (b') ceases, at which time contacts 125 and switch 100 open. The response of the computer to the signal (c') is exactly like its above described response to signal (b') except that in this case decoder 40, decoder 59, memory device 38, relay group 54 and switch 106 are involved. As in the case of signal (b') no revolutions of shaft 11 are produced by signal (c') and also no resetting of bridge 12 takes place.

The third part (f) of the new signal however differs from the third part (d) of the initial signal in calling for 40 revolutions of shaft 11 whereas the initial signal called for 60 revolutions. The computer, therefore, must respond to signal (f) to rotate shaft 11 backward through 20 revolutions. This is accomplished as follows: Application of signal (f) to the computer produces output voltages from gear box decoder 51 and digit decoder 61. The voltage from decoder 51 closes contacts 130 and opens contacts 74. Closure of contacts 130 engages magnetic clutch 43 and closes switches 104 and 107. Memory device 42 was set during the initial cycle of operation of the computer so that switch 131 rests on contact 6 and switch 132 makes connection to all contacts below 6, corresponding to the balance point of bridge 12 in the third step of the initial cycle of operation of the computer. At this time contact 18 of the bridge and the rotating contact of switch 78 are in their zero positions.

Segments 0-5 of rotary switch 78 are energized by connection through switch 104 to contacts 0-5 of switch 132 in memory device 42. Closure of digit relay 23 by the output voltage of decoder 61 therefore causes voltage to be applied through the moving contact of switch 78, contacts 82, 83, 84 and 85, and the lower contacts of digit relay 23 to coil 86 of relay 71. Energization of coil 86 opens contacts 87 which removes the voltage that was applied to coil 134 from E through contacts 88, 87 and the middle contact of relay 23 when this relay closed. In order to insure that contacts 67 and 133 do not close before contacts 87 have had time to open a delayed actuation type relay is used as indicated by the symbol DA.

Energization of coil 86 operates relay 71 to the right causing motor 70 to rotate switch 78 and bridge contact 18 clockwise. This rotation continues until the moving contact of switch 78 reaches the first deenergized segment which in this case is segment 6. At this point coil 86 is deenergized and motor 70 stops. Contact 18 of the bridge has now been reset to tap 6 which was the balance point in the third step of the initial cycle of operation.

Removal of voltage from coil 86 allows contacts 87 to close thus applying voltage through the middle contacts of digit relay 23 to coil 134 and closing contacts 133 and 67. Closure of contacts 133 energizes magnetic clutch 41 through switch 104, while closure of contact 67 applies the output of the bridge to control amplifier 68. Since the balance point of bridge 12 is now at tap 4 whereas the contact 18 is at tap 6, the phase of the output voltage will be reversed with respect to previously considered cases. The reversed phase output voltage operates through phase sensitive control amplifier 68 to cause reversed rotation of motor 69 and shaft 11. Since bridge contact 18 is now coupled to shaft 11 through clutches 41 and 43, memory device 42 and 100/1 gear box 44 the contact is rotated in a counterclockwise direction until it reaches tap 4 at which point the bridge balances and its output becomes zero, resulting in deenergization of motor 69. Also, when the bridge balances, the moving contact of switch 131 in memory device 42 has reached contact 4 which results in a voltage being applied through switch 107 to coil 101 opening contacts 102 and deenergizing digit relay 23. Opening of the relay contacts deenergizes coil 134 and opens contacts 67 and 133 which disconnects the bridge from amplifier 68 and releases magnetic clutch 41. No further action takes place until signal (f) ceases, at which time contacts 130 open and contacts 74 close. Opening of contacts 130 releases magnetic clutch 43 and switches 104 and 107. Closure of contacts 74 resets the bridge to zero, terminating the third step in the cycle of computer operation. In moving the bridge from tap 6 to tap 4 through the 100/1 gear box the shaft 11 reduced its total number of revolutions by 20.

The last of the four steps in this cycle is initiated by the signal (g) of Fig. 7. Like signal (f) this signal differs from the signal in the fourth step of the preceding cycle of operation of the computer, calling for eight revolutions of the shaft as compared to four in the initial cycle. The computer therefore must operate to rotate the shaft forward through four revolutions to raise the number in this step from four to eight.

The response of the computer to signal (g) is similar in all respects to its response to signal (f) described in detail above. The signal acts through decoders 52 and 65 to engage the 10/1 gear box 48 by actuating magnetic clutch 47 and to close digit relay 27. The memory device 46, which still has the position to which it was set in the fourth step of the initial cycle of operation, acts through rotary switch 78 and motor 70 to reset the bridge to tap 4. Motor 69 is then energized and rotates bridge contact 18 in a clockwise direction through shaft 11, gear box 48 and memory device 46 until the bridge balances at tap 8. Moving arm 18 from tap 4 to tap 8 though the 10/1 gear box requires 4 revolutions of shaft 11.

In the third and fourth steps in this cycle of operation the computer responded to signal (f) to rotate the shaft 11 backward through 20 revolutions and responded to signal (g) to rotate the shaft 11 forward through 4 revolutions. The net result of the entire signal of Fig. 7 therefore was a backward rotation of shaft 11 of 16 revolutions which reduced the previous total of 1264 revolutions to the required new total of 1248 revolutions. Any number of signals of the type shown in Fig. 7 may be applied in succession to the computer. The computer will respond to each of these signals to change the total number of revolutions of the shaft 11 to the number specified in the signal by adding to or subtracting from the existing total number of revolutions of the shaft by the required amount in the manner described above.

I claim:

1. A computer for converting a coded electrical signal into a specified total number of revolutions of a shaft as measured from a start or zero revolution position thereof, said signal having a plurality of successively occurring parts each corresponding to one place of the decimal number representing the maximum total number of shaft revolutions of which the computer is capable, said computer comprising a shaft, a reversible motor coupled to said shaft for rotating it in either direction, a Wheatstone bridge comprising two branch circuits connected in parallel each consisting of a fixed resistance arm and an adjustable resistance arm connected in series, each of said adjustable arms being divided by ten taps into nine equal parts, means for applying an energizing voltage to said bridge across said parallel branch circuits, an output circuit for said bridge connected to points between said fixed and adjustable resistance arms, a control circuit connected to said motor, said control circuit being responsive to output voltage from said bridge to energize and control the direction of rotation of said motor, a plurality of reduction gear boxes equal in number to the number of places in said decimal number and each corresponding to one of said places, an equal number of bridge coupling means, each of said gear boxes having its driven side coupled to said shaft and its driving side selectively coupled through a corresponding bridge coupling means to the adjusting mechanism of one of the adjustable arms of said bridge, the ratio of the gear box corresponding to the lowest ordered place of said decimal number being such that nine revolutions of said shaft are required to adjust said one adjustable arm from zero to maximum resistance, the ratios of the remaining gear boxes being equal to a multiple of ten times the ratio of said lowest ordered gear box, an equal number of gear box decoders each corresponding to one of said places in said decimal number, means responsive to an output signal from any of said gear box decoders to couple the driving side of the corresponding gear box through the corresponding bridge coupling means to said one adjustable bridge arm, ten digit decoders each corresponding to one of the taps on the other of said adjustable bridge arms, means responsive to an output signal from any of said digit decoders to connect the corresponding tap of said other bridge arm to said bridge circuit and to connect the output circuit of said bridge to said control circuit for energizing and controlling the direction of rotation of said motor, for the purpose of driving the adjusting mechanism of said one adjustable arm through the appropriate gear box and bridge coupling means to balance said bridge, and means for applying said coded electrical signal to the input circuits of said gear box decoders and digit decoders in parallel.

2. Apparatus as claimed in claim 1 in which each bridge coupling means comprises a memory device for recording the balance point of said bridge, and means acting in response to any output signal of a gear box decoder and any corresponding output signal of a digit decoder, other than the first output signals thereof, said means including the corresponding memory device, to reset said bridge to the point of balance last recorded by said memory device, and means operative at the completion of said resetting to couple said shaft to said one adjustable bridge arm through the corresponding bridge coupling means and to apply the output of said bridge to said motor control circuit for adjusting said bridge from the said last recorded position of balance to a new position of balance as called for by the existing signal.

3. Apparatus as claimed in claim 2 in which means are provided for preventing the application of the output signal of said bridge to said control circuit during the resetting of said bridge to a recorded balance point.

4. Apparatus as claimed in claim 3 in which means are provided for preventing the energization of the recorded balance point resetting elements until an initial output signal has occurred from all gear box decoders.

5. Apparatus as claimed in claim 4 in which said coded electrical signal is preceded by a start signal and in which a start decoder is provided for producing an output signal in response to said start signal, and means responsive to the output signal from said start decoder to reset all said memory devices to zero and to set said means for preventing energization of the recorded balance point setting elements.

6. Apparatus as claimed in claim 5 in which means, responsive to the termination of any output signal from any gear box decoder, are provided for resetting said one adjustable bridge arm to zero.

LUDLOW B. HALLMAN, Jr.

References Cited in the file of this patent

UNITED STATES PATENTS

| Number | Name | Date |
|---|---|---|
| 2,537,427 | Seid | Jan. 9, 1951 |